United States Patent Office 3,263,535
Patented August 2, 1966

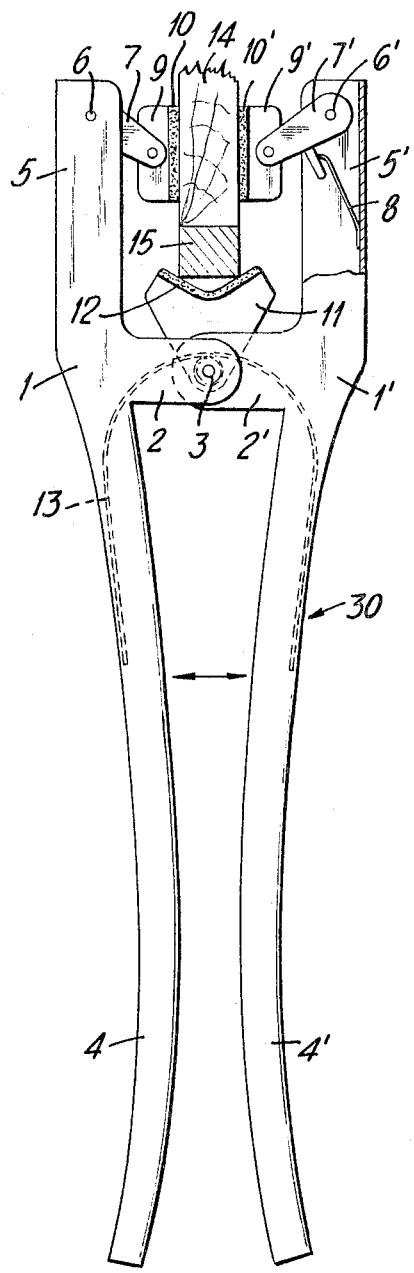

3,263,535
CLAMPING PLIERS HAVING THREE JAWS, TWO OF WHICH ARE CONNECTED BY LEVERS TO THE HANDLE MEMBERS
Erwin Zürcher, Steckborn, Thurgau, Switzerland
Filed Dec. 31, 1964, Ser. No. 422,587
5 Claims. (Cl. 81—302)

This invention relates, in general, to tool construction and, in particular, to a new and useful device for holding and clamping together two workpieces which are to be joined.

In various industries, but particularly in the carpentry industry, it is frequently necessary to press rod-shaped workpieces, for example, moldings or bars against plate-shaped workpieces, for example, boards, table leaves or the like. This occurs especially when the two workpieces are to be joined together whether by welding or by screwing or with adhesive or glue. Especially in the latter case, it is necessary to have a sufficient pressing pressure on the two parts in order to obtain a firm and homogeneous union thereof.

Prior to the present invention, there have been available either machines in the nature of clamping frames which provide means for anchoring the two elements in position relative to one another. Such devices usually employ threaded elements, such as vises or clamping claws. The adjustment of such devices is time consuming and they are usually large stationary elements requiring the workpieces to be brought to them. Portable tools, used heretofore, such as screw vises, clamping claws and the like, have the disadvantage that their attachment is time consuming because they have to be applied to the workpieces by adjusting relatively long threaded elements or by employing several successive operations. In addition, it is usually necessary to use both hands for their application so that usually two people are required to join or fit together two workpiece elements.

In accordance with the present invention, there is provided a plier-like tool, which can be operated with one hand and can be applied to the workpieces to be joined in a single operation. The device is characterized by arm elements which are pivoted in a manner of the plier and carry pivot levers which extend obliquely into the mouth of the plier elements. The levers carry members which move against a workpiece to be clamped and urge it downwardly against a workpiece which is positioned in a holding base or support within the mouth of the pliers. The tool works to urge the two workpieces into engagement with a holding pressure being applied to the workpieces.

Accordingly, it is an object of this invention to provide a tool which is advantageously portable and comprises a hand element which may be manipulated by one hand to urge one workpiece into association with another.

A further object of the invention is to provide a plier device which includes the usual pivotal lever members with handle portions which may be swung about the pivotal connection for opening and closing a mouth portion and wherein the mouth portion is provided with lever elements which are inclined inwardly in the mouth portion and carry bearing elements or shoes which are adapted to be made to bear against a workpiece and urge it in a direction into the mouth of the tool.

A further object of the invention is to provide a portable hand operated plier device having gripping handles which are spring biased outwardly about their pivotal mounting to urge the mouth portion of the tool to a closed clamping position; and in which the mouth portion is formed by lever arm elements having levers extending inwardly at an acute angle and which are biased in an outward direction by spring means, the levers carrying pivotal jaw elements which are adapted to engage a workpiece, the mouth having a supporting element for holding another workpiece in alignment with the first workpiece.

A further object of the invention is to provide a tool which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

In the drawing:

The only figure in the drawing is a partial side elevational and partial sectional view of a tool constructed in accordance with the invention.

Referring to the drawing, in particular, the invention embodied therein comprises a pliers or tool generally designated 10 for positioning and holding two workpieces together. The tool 10 includes double armed levers 1 and 1' which are pivoted together at a pivot pin 3 at the inner ends of inwardly projecting leg portions or nose-shaped lugs 2 and 2'. The levers 1 and 1' include short mouth-forming ends or portions 5 and 5' and handle-forming ends or portions 4 and 4'.

In accordance with the invention, the mouth-forming ends 5 and 5' are each provided with a pivot lever 7 and 7', respectively, which are pivotally mounted at pivot pins 6 and 6', respectively. A spring 8 acts against each associated lever 7 or 7' to urge it to rotate about its pivot in a direction to move its inner end outwardly from the mouth defined between the portions 5 and 5'. A stop (not shown) on the associated end portions 5 and 5' prevents the outward movement of the levers 7 and 7' beyond a predetermined location.

Jaws or shoe elements 9 and 9' are pivotally mounted on each lever 7 and 7', respectively, and have contact areas which are advantageously provided with a gripping covering 10 or 10', respectively, which may include a sticky, roughened or toothed formation.

In the base of the mouth, defined between the end portions 5 and 5', is arranged a counter jaw or inner supporting member 11 which is preferably fastened to the pivotal joint pin 3. The jaw 11 advantageously includes a contact area which is advantageously hollowed out to form an angular or curved configuration which is provided with a covering 12 which functions in a manner similar to the coverings 10 and 10' for the protection of the workpieces as well as for better gripping. The jaw 11 may advantageously have a notch or groove which extends perpendicular to the pivot pin 3 which makes it possible to press the ends of two moldings or other workpiece elements which extend at right angles to each other against the corner of the jaw 11.

A feature of the invention is that when the handle portions 4 and 4' are moved inwardly or outwardly, the lever elements 7 and 7', besides being moved inwardly or outwardly, correspondingly have their inner ends with the jaws 9 and 9' moved either upwardly or downwardly. In the arrangement illustrated, a relatively strong spring 13 designed as either a leg spring, or, in the example shown, as a helicoidal spring urges the handles 4 and 4' apart to cause the plier mouth to be closed by the inward movement of the outer end portions 5 and 5'. The handles 4 and 4' may be pressed together by the operator's hand to overcome the biasing force of the spring 13, and in such event, the portions 5 and 5' will be moved apart for receiving a workpiece.

The use of the device is as follows: The two handles 4 and 4' are pressed together counter to the action of the spring 13 so that the mouth opens. A workpiece, for example, a board 14 and a workpiece 15 to be pressed against it, for example, a molding will be positioned within the mouth. The workpiece 15 is advantageously placed on the jaw 11 and the workpiece 14 is aligned in respect thereto after the handle portions 4 and 4' are pressed to open the mouth. When the handles 4 and 4' are released, the jaws 9 and 9' with their coverings 10 and 10' will be urged against the workpiece 14 and will exert a downward pressure on the workpiece 14 to urge it into association with the workpiece 15. The downward pressure is caused by the rotation of the lever elements 7 and 7' against their respective spring 8. The greater the pressure in which the spring 13 exerts on the plier levers 4 and 4', the greater will be the force which the workpiece 14 is pressed against the workpiece 15.

It is evident from the described operation of the device, according to the invention, how simple its manipulation is. It suffices to grip the device with one hand, to bring it into working position and to let it go again, and without any additional manipulation to effect a satisfactory pressing together of the two workpieces to be joined. During the operation, one hand can remain free to hold the workpieces in their mutually engaged position until this function has been taken over by one or more of the devices according to the invention. The invention may, however, be used also as an ordinary spring clamp or spring vise. The simplicity of the device permits not only the described convenient handling, but also an inexpensive manufacture.

While a specific embodiment of the invention has been shown and described in detail to illustrate the application of the inventive principles, it will be understood that the invention may be embodied otherwise without departing from such principles.

What is claimed is:

1. A tool comprising a first and second lever members pivoted together intermediate their lengths, said members including a pair of mouth-forming portions movable toward and away from each other in response to corresponding opposite movement of a pair of handle portions, means defining a support for a workpiece within the mouth formed between the mouth-forming portions, a lever connected to each of said mouth-forming portions and extending toward the respective opposite mouth-forming portion and toward said supporting means, a workpiece engaging jaw pivotally carried on the inner ends of each of said levers, said handle portions being movable together to open the mouth by moving said mouth-forming portions with said levers outwardly for the reception of a workpiece between said jaws, said handle portions being movable outwardly to move said mouth-forming portions inwardly toward engagement with each other and to move said jaws into clamping engagement with a workpiece, the lever members carrying said jaws being inclined so that the workpiece clamped by said jaws is also moved into the mouth and toward said workpiece supporting means.

2. A tool comprising first and second lever members pivoted together intermediate their lengths thereof, said members including a pair of mouth-forming portions movable toward and away from each other in response to corresponding opposite movement of a pair of handle portions, means defining a support for a workpiece within the mouth formed between the mouth-forming portions, a lever connected to each of said mouth-forming portions and extending toward the respective opposite mouth-forming portion and toward said supporting means, a workpiece engaging jaw pivotally carried on the inner ends of each of said levers, said handle portions being movable together to open the mouth by moving said mouth-forming portions with said levers outwardly for the reception of a workpiece between said jaws, said handle portions being movable outwardly to move said mouth-forming portions inwardly toward engagement with each other to move said jaws into clamping engagement with a workpiece, the lever members carrying said jaws being inclined so that the workpiece clamped by said jaws is also moved into the mouth and toward said workpiece supporting means, said levers being pivotally mounted on said mouth-forming portions, and means to bias said levers for rotation about their pivotal mountings to urge said levers with said jaws outwardly from the mouth of said tool.

3. A tool comprising first and second lever members pivoted together intermediate their lengths thereof, said members including a pair of mouth-forming portions movable toward and away from each other in response to corresponding opposite movement of a pair of handle portions, means defining a support for a workpiece within the mouth formed between the mouth-forming portions, a lever connected to each of said mouth-forming portions and extending toward the respective opposite mouth-forming portion and toward said supporting means, a workpiece engaging jaw pivotally carried on the inner ends of each of said levers, said handle portions being movable together to open the mouth portion by moving said mouth-forming portions with said levers outwardly for the reception of a workpiece between said jaws, said handle portions being movable outwardly to move said mouth-forming portions inwardly toward engagement with each other to move said jaws into clamping engagement with a workpiece, the levers carrying said jaws being inclined so that the workpiece clamped by said jaws is also moved into the mouth and toward said workpiece supporting means, a spring biasing said handle portions in directions to move them outwardly away from each other and to tend to close the mouth formed between said mouth-forming portions.

4. A tool comprising first and second lever members pivoted together intermediate their lengths thereof, said members including a pair of mouth-forming portions movable toward and away from each other in response to corresponding opposite movement of a pair of handle portions, means defining a support for a workpiece within the mouth formed between the mouth-forming portions, a lever connected to each of said mouth-forming portions and extending toward the respective opposite mouth-forming portion and toward said supporting means, a workpiece engaging jaw pivotally carried on the inner ends of each of said levers said handle portions being movable together to open the mouth portion by moving said mouth-forming portions with said levers outwardly for the reception of a workpiece between said jaws, said handle portions being movable outwardly to move said mouth-forming portions inwardly toward engagement with each other to move said jaws into clamping engagement with a workpiece, the levers carrying said jaws being inclined so that the workpiece clamped by said jaws is also moved into the mouth and toward said workpiece supporting means, said means defining a support including a jaw element having a curved surface with the lowermost portion of the curved surface being centered within the mouth formed by said mouth-forming portions.

5. A tool comprising first and second lever members each having an inwardly formed lug, said levers being arranged with their lugs extending in opposition and being pivotally connected at said lugs, the portions of said lever members on one side of said lugs forming a mouth and the portions of said levers on the other side of said lugs forming handles, a workpiece support carried on said pivotal connection of said lever members and extending into the mouth, first and second lever elements respectively connected to said first and second lever members adjacent the ends thereof and extending in respective opposite inward directions downwardly into the mouth defined between said levers, a jaw element pivotally connected to the interior end of each of said lever elements, and spring means urging said handle portions outwardly to urge said mouth-forming portions with said jaws inwardly into engagement with a workpiece.

References Cited by the Examiner

UNITED STATES PATENTS

| | | | |
|---|---|---|---|
| 1,075,384 | 10/1913 | Seidel | 269—156 |
| 2,488,484 | 11/1949 | Clute | 81—420 X |
| 2,815,777 | 12/1957 | Iraids | 81—302 X |
| 3,061,357 | 10/1962 | Wright | 81—424 X |

WILLIAM FELDMAN, *Primary Examiner.*

MILTON S. MEHR, *Examiner.*